(12) United States Patent
Dayan et al.

(10) Patent No.: US 9,275,331 B2
(45) Date of Patent: Mar. 1, 2016

(54) DOCUMENT CLASSIFICATION SYSTEM WITH USER-DEFINED RULES

(71) Applicant: International Business Machines Corporation, Armonk, NY (US)

(72) Inventors: Yigal S. Dayan, Jerusalem (IL); Gil Fuchs, Jerusalem (IL); Josemina M. Magdalen, Jerusalem (IL); Oren Paikowsky, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/899,974

(22) Filed: May 22, 2013

(65) Prior Publication Data

US 2014/0351258 A1 Nov. 27, 2014

(51) Int. Cl.
*G06F 7/00* (2006.01)
*G06F 17/30* (2006.01)
*G06N 3/08* (2006.01)

(52) U.S. Cl.
CPC ............ *G06N 3/08* (2013.01); *G06F 17/30011* (2013.01); *G06F 17/30705* (2013.01); *G06F 17/30707* (2013.01)

(58) Field of Classification Search
None
See application file for complete search history.

(56) References Cited

U.S. PATENT DOCUMENTS

| | | | | |
|---|---|---|---|---|
| 5,832,470 | A * | 11/1998 | Morita | G06F 17/3071 |
| 6,092,059 | A * | 7/2000 | Straforini et al. | 706/14 |
| 7,873,205 | B2 * | 1/2011 | Okuda | G06K 9/6277 |
| | | | | 382/141 |
| 8,103,615 | B2 | 1/2012 | Fogel et al. | |
| 8,296,309 | B2 | 10/2012 | Brassil et al. | |
| 8,805,843 | B2 * | 8/2014 | Chen | G06N 5/022 |
| | | | | 707/708 |
| 2002/0183999 | A1 * | 12/2002 | Black et al. | 703/22 |
| 2003/0200188 | A1 * | 10/2003 | Moghaddam | G06K 9/6256 |
| | | | | 706/25 |
| 2004/0139059 | A1 * | 7/2004 | Conroy | G06F 17/30011 |
| 2005/0185845 | A1 * | 8/2005 | Luo | G06K 9/00362 |
| | | | | 382/224 |
| 2005/0246300 | A1 * | 11/2005 | Tsukamoto | G06F 17/3071 |
| | | | | 706/46 |
| 2006/0120609 | A1 * | 6/2006 | Ivanov et al. | 382/224 |
| 2006/0179020 | A1 * | 8/2006 | Bradski | G06K 9/6256 |
| | | | | 706/20 |
| 2006/0179021 | A1 * | 8/2006 | Bradski | G06K 9/6256 |
| | | | | 706/20 |
| 2006/0212413 | A1 * | 9/2006 | Rujan et al. | 706/20 |
| 2006/0294099 | A1 * | 12/2006 | Tsukamoto | G06F 17/30707 |
| 2007/0043690 | A1 * | 2/2007 | Inakoshi et al. | 707/1 |
| 2007/0265991 | A1 * | 11/2007 | Collobert | G06K 9/6269 |
| | | | | 706/16 |

(Continued)

*Primary Examiner* — Hexing Liu
(74) *Attorney, Agent, or Firm* — North Shore Patents, P.C.; Michele Liu Baillie (57) ABSTRACT

Machines, systems and methods for classifying documents, the method comprising: classifying a document from among a plurality of documents in a first class, in response to applying statistical analysis to data associated with the document; classifying the document in a second class, in response to determining that a rule from among a plurality of rules applies to the document, wherein a proposed rule is added to the plurality of rules, in response to determining that application of the proposed rule to one or more of the plurality of documents to which the rule is applicable does not diminish accuracy of overall classification for the plurality of documents.

6 Claims, 5 Drawing Sheets

(56) References Cited

U.S. PATENT DOCUMENTS

| | | | |
|---|---|---|---|
| 2008/0005106 A1 | 1/2008 | Schumacher et al. | |
| 2008/0008378 A1* | 1/2008 | Andel | G06K 9/2054 382/141 |
| 2008/0103998 A1* | 5/2008 | Gates | G06N 99/005 706/12 |
| 2008/0154820 A1* | 6/2008 | Kirshenbaum | G06K 9/6292 706/20 |
| 2008/0195611 A1* | 8/2008 | Chen | G06F 17/30705 |
| 2009/0030862 A1* | 1/2009 | King | G06F 17/30705 706/45 |
| 2009/0222390 A1* | 9/2009 | Yuta | G06F 17/30412 706/13 |
| 2010/0114895 A1* | 5/2010 | Bhagwan | G06F 17/30539 707/740 |
| 2012/0027285 A1* | 2/2012 | Shlain | G06K 9/6256 382/149 |
| 2013/0304743 A1* | 11/2013 | Kurokawa | G06F 17/30268 707/740 |
| 2013/0318088 A1* | 11/2013 | Futty | G06F 17/30507 707/740 |
| 2014/0101119 A1* | 4/2014 | Li | G06F 17/30657 707/706 |
| 2014/0351258 A1* | 11/2014 | Dayan | G06F 17/30705 707/740 |

\* cited by examiner

DOCUMENT CLASSIFICATION SYSTEM WITH USER-DEFINED RULES

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to classifying documents and, more particularly, to a system and method for classifying documents in various categories according to the content of the documents and user-defined rules.

BACKGROUND

Automated systems are available that can classify digital documents based on the statistical analysis of the content and data associated with the documents, while taking into consideration one or more user-defined rules. The rules are typically provided by a human operator to help enhance the classification capabilities of the automated system. Adding rules is a labor intensive task and although it may improve classification of some documents, it can also degrade the overall classification accuracy of the system, if a rule does not apply to some documents.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for classifying documents, the method comprising: classifying a document from among a plurality of documents in a first class, in response to applying statistical analysis to data associated with the document; classifying the document in a second class, in response to determining that a rule from among a plurality of rules applies to the document, wherein a proposed rule is added to the plurality of rules, in response to determining that application of the proposed rule to one or more of the plurality of documents to which the rule is applicable does not diminish accuracy of overall classification for the plurality of documents.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
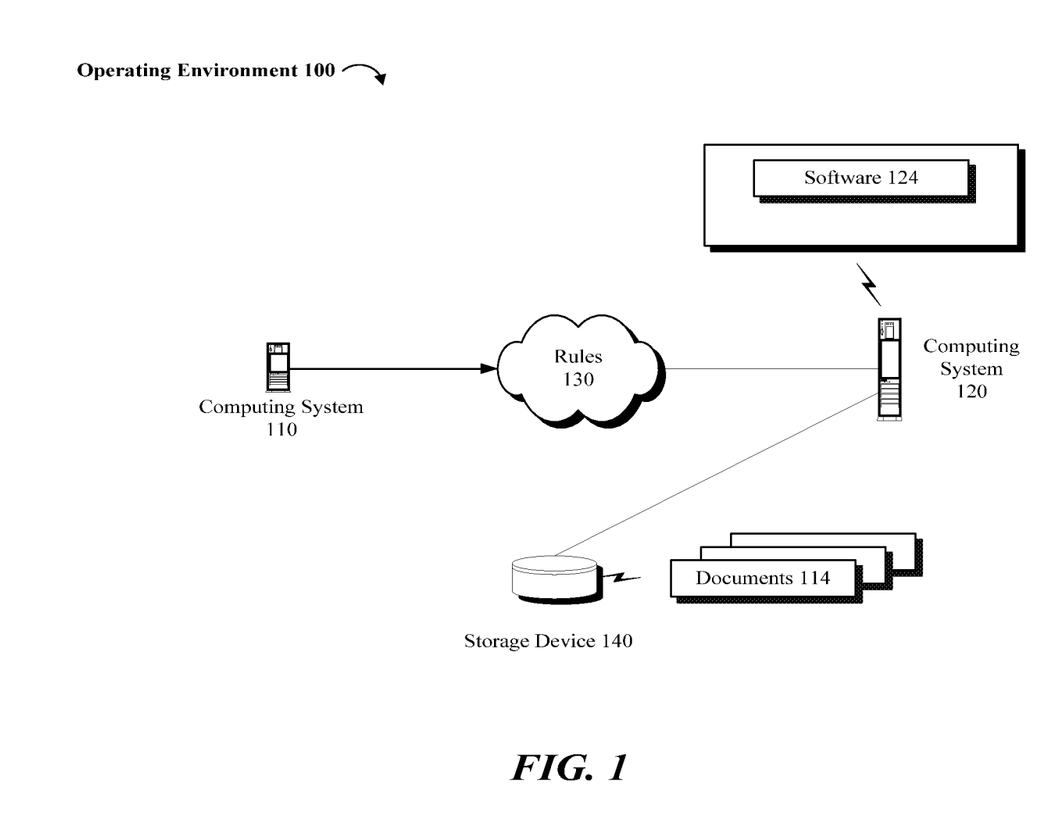
FIG. 1 illustrates an exemplary operating environment in accordance with one or more embodiments, wherein one or more digital documents may be classified by an automated classification system.

Referring to FIG. 1, an exemplary operating environment 100 is illustrated, having a document classification system comprising software 124. Software 124 runs on a computing system 120 and is configured to classify documents 114 stored in a storage device 140. Software 124 may be used to analyze and categorize a target document into a predetermined category (or class) recognized by the classification system. For example, document A may be classified in category X, if the statistical analysis of the content of document A indicates that the document may be associated with categories X, Y and Z and that category X is the most proper category for document A, because based on the statistical analysis for document A, X ranked higher than Y and Z.

Figure 2:
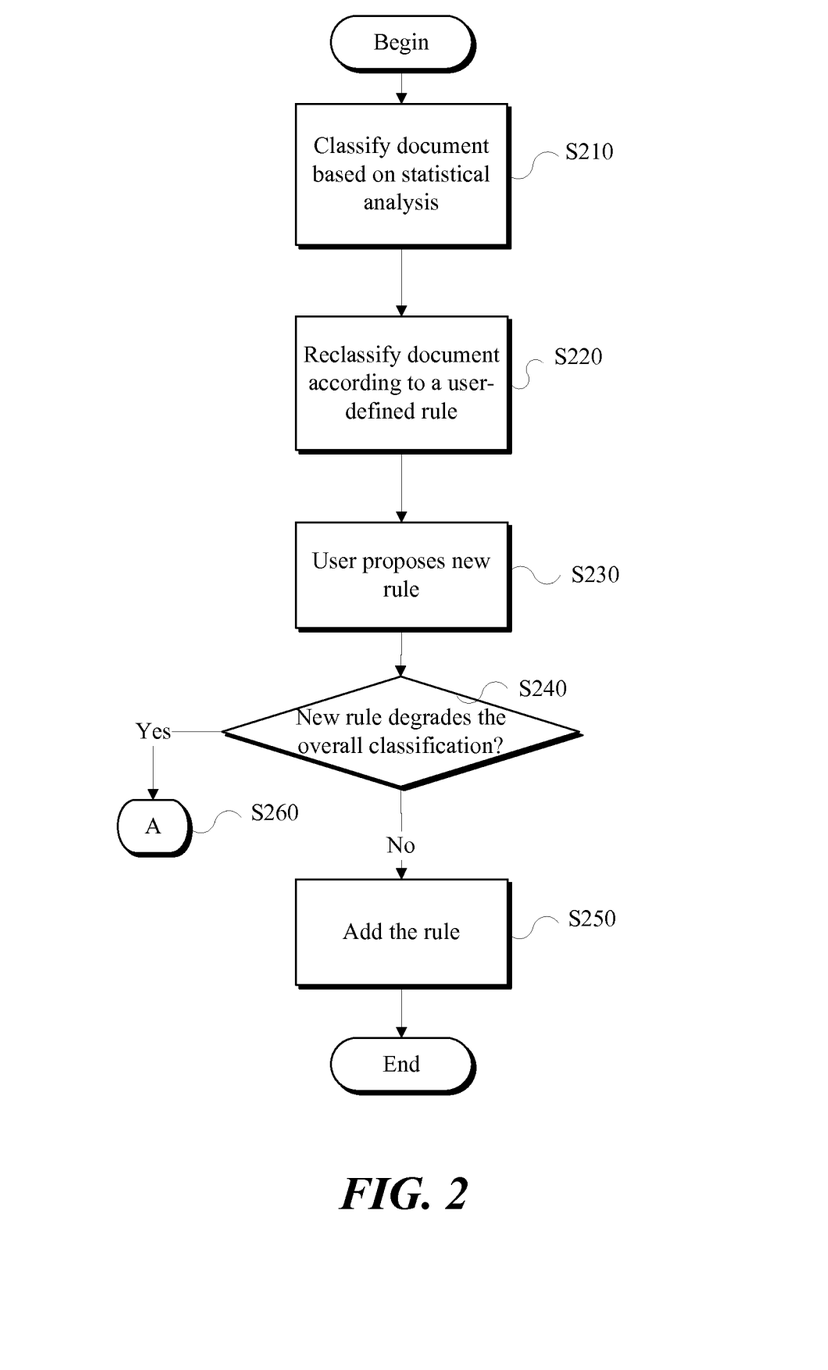
FIG. 2 is an exemplary flow diagram of a method of classifying a plurality of documents, in accordance with one embodiment.

Referring to FIG. 2, a document may be classified based on statistical analysis of data (e.g., metadata) associated with the document or the content of the document (S210). The document may be reclassified if a user (e.g., using a computing system 110) has defined one or more rules 130 that apply to the document (S220). For example, a user may define a rule indicating that document A should be classified in category Y, if a certain condition is met (e.g., if the metadata associated with document A indicates that the author of the document is Mr. John Doe). The user may be provided with an interface (not shown) to create a new rule (S230) and also to indicate the reason for adding the rule to the system for the purpose of future reference. That is, when the user creates a rule, the user may have the option to include a statement indicating why the rule was created.

Due to various factors (e.g., human error in defining a rule, etc.), the strict application of a user-defined rule may result in misclassification of some documents, even if other documents are properly classified based on the same rule. As such, in one implementation, before the addition of a proposed rule to the classification system, the proposed rule is tested against some or all the documents 114 that have been previously classified by the system. The test results are analyzed to determine if application of the proposed rule resulted in the misclassification of one or more of the previously classified documents 114 and the degradation of the overall classification (S240). If not, then the proposed rule is added (S250), or remedial action is taken (S260), as provided in further detail below.

In one embodiment, depending on the results of the test phase, a proposed rule may be added or rejected, or alternatively added but applied according to a so-called damping factor. The damping factor is a score or value that may be used to increase or decrease the application of a rule to a document for the purpose of classification. For example, if it is determined that a newly proposed rule does more harm than good, the damping factor is set to a relatively small value (e.g., 0.1). Depending on implementation, setting the damping factor to zero for a rule, for example, would in effect disable the rule. Accordingly, a proposed rule may be set to have a low potency, if the application of the proposed rule, during the testing phase, resulted in misclassification of more than a certain number or a certain percentage of previously classified documents 114.

As an example, if over 50% of the documents to which the rule was applied are misclassified (as a result of applying the rule), then the rule may be subject to a damping factor of 0.1 or 0.0. On the other hand, if the application of the rule did not result in misclassification or if application of the rule enhanced the classification of some or all of the previously classified documents 114, then the proposed rule may be accepted and a high damping factor (e.g., 0.9 or 1.0) may be applied to the rule once the rule is added to the system. It is noteworthy that using a damping factor may be more flexible in that it allows for the future acceptance of a rule which would be otherwise rejected based on the result of the test phase.

Figure 3:
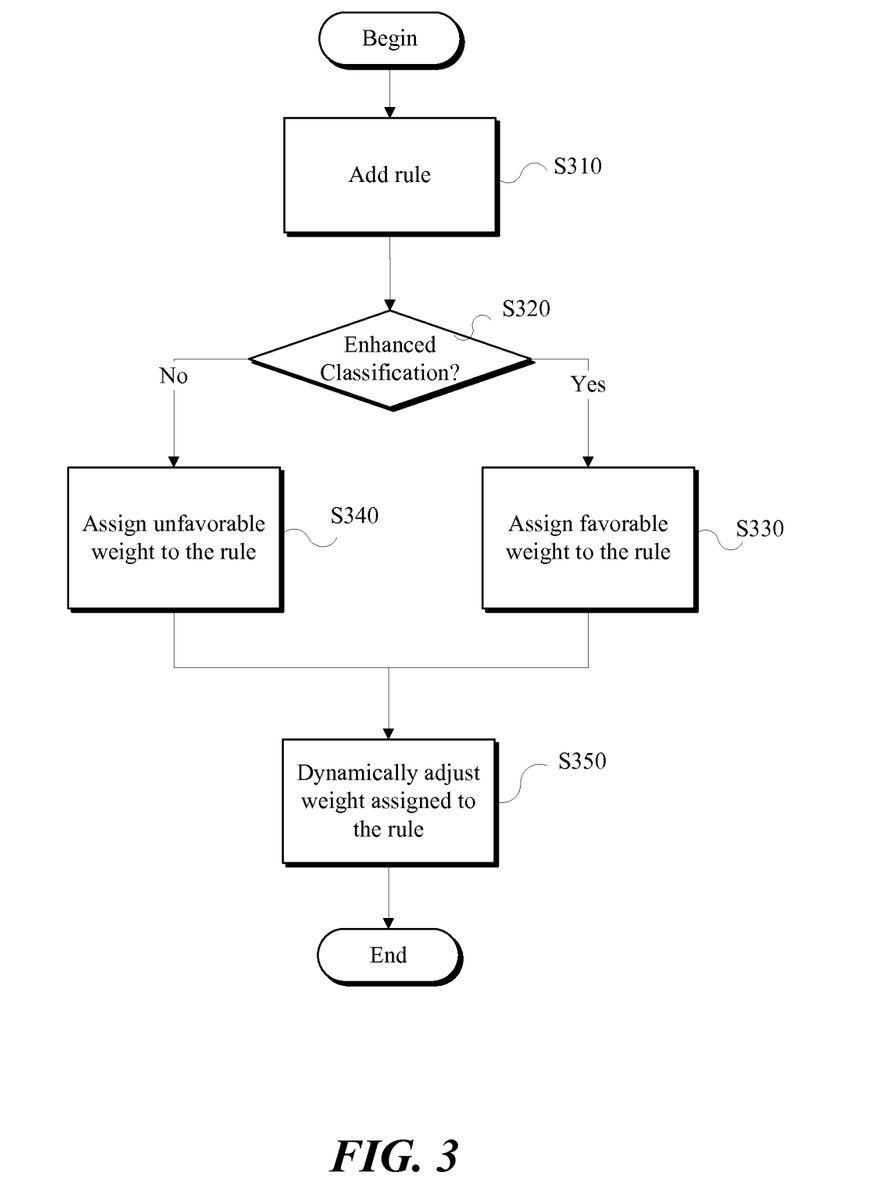
FIG. 3 is a flow diagram of an exemplary method for applying a damping factor to a rule, in accordance with one embodiment.

Referring to FIG. 3, in some implementations, instead of rejecting or accepting a proposed rule outright, a proposed rule may be added to the system (S310) according to one or more damping factors, as suggested above. In other words, a score or weight may be assigned to the rule based the outcome of the results in the testing phase. If the test results indicate that the rule enhanced the classification process (S320), then a favorable weight (e.g., a high score) is assigned to the rule (S330). Otherwise, an unfavorable weight (e.g., a low score) may be assigned (S340). The weight assigned to a rule affects the potency of application of the rule. In a simplistic implementation, if the score is zero, the rule is never applied; if the score is 1, the rule is always applied, for example.

It is noteworthy that the weight or score assigned a rule may be dynamically adjusted as new or additional documents are analyzed and classified, or as new rules are added to the system (S350). For example, a score assigned to a rule may be increased from 0.1 to 0.7, if additional analysis (i.e., analysis performed after the first testing phase) indicates that application of the rule is enhancing the classification of the document more than before. Alternatively, the score assigned to a rule may be reduced from 0.8 to 0.3, for example, if additional analysis indicates that the application of the rule is degrading the classification process as the number of documents grows.

In one scenario, the weight of the score assigned to a rule is taken into consideration during statistical analysis to boost or decrease the applicability of a predefined category to a document. For example, let us assume that rule R1 is associated with category X1 and rule R2 is associated with category X2. Let us also assume that based on statistical analysis (and prior to application of R1 or R2), X1 and X2 are considered to be the categories in which document A should be classified in, and that the classification system is implemented so that one category, either X1 or X2, needs to be selected as the proper category for document A.

Let us further assume that R1 indicates that document A should be classified under X1, and R2 indicates that document A should be classified under X2. In this simplified example, if the score assigned to R1 is higher than the score assigned to R2, then document A will be classified under category X1, otherwise it will be classified under category X2. While the above scenario is a trivial example of the application of rules with different scores, it highlights the manner in which scores assigned to different rules may be used. As such, a rule's score may be used to determine the proper classification for a document in combination with other factors that are taken into consideration by way of statistical analysis.

In one embodiment, using the latest available statistical data, the damping factors for the rules may be recalculated periodically (e.g., by way of a process running in the background). For this purpose, a temporary rule engine may be constructed to cover the same user-defined rules, wherein instead of modifying document classification, the rule engine inserts values into a data structure (e.g., an array, a bitmap, etc.) hereafter referred to as a status matrix. Documents 114 may be run through the temporary rule engine and then the status matrix may be examined, as provided in further detail below.

For example, a cell Cij in the status matrix may include status information for document i, with respect to rule j. The cell Cij may have the following values:

1: classification of document i is improved by rule j
−1: classification of document i is spoiled by rule j
0: classification of document i is unaffected by rule j If the matrix columns are summed up, a tally for each rule (j) may be calculated to determine how many documents are improved, spoiled, or unaffected by a particular rule that has been added to the document classification system. A new damping factor may be calculated for each rule based on the status of the rule in the status matrix and according to the values of the corresponding cells in the matrix. A simple example formula for a rule damping factor is provided below:

$$factor = tally.positive\_effect / (tally.positive\_effect + tally.negative\_effect)$$

For example, if analyzing the data in the status matrix indicates that a rule has had a positive effect on 100 documents and a negative effect on 50, then the damping factor for the rule may be 100/(100+50)=0.66. Given a document with statistical scores for a plurality of categories, a rule that is triggered by the document may boost a particular category's score towards the maximum score (e.g., 1.0). A simple example formula for boosting a categories score is provided below:

$$new\_category\_score = old\_category\_score + (rule\_factor * (1 - old\_category\_score))$$

For example, if category X's score is 0.7, and a document A triggers a rule that boosts category X with a damping factor of 0.5, category X's score may be increased from 0.7 to 0.85=(0.7+(0.5*(1−0.7))=0.7+(0.5*0.3)) based on the above example formula. On the other hand, if the damping factor is 0, for example, the rule will not boost the category's score. If the damping factor is 1, for example, the rule will boost the score to the maximum value (e.g., 1).

Advantageously, a classification system implemented according to the above features allows less sophisticated users (e.g., users with limited knowledge of the classification system or documents content) to more confidently define and propose new sets of rules without the apprehension of whether the addition of a rule to the classification system in a specific scenario may have adverse consequences for the overall system or future system performance. The proposed rules are tested and ranked before deployment and are further tested and re-ranked dynamically (e.g., by way of a background process) as the classification system matures and additional documents are analyzed.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
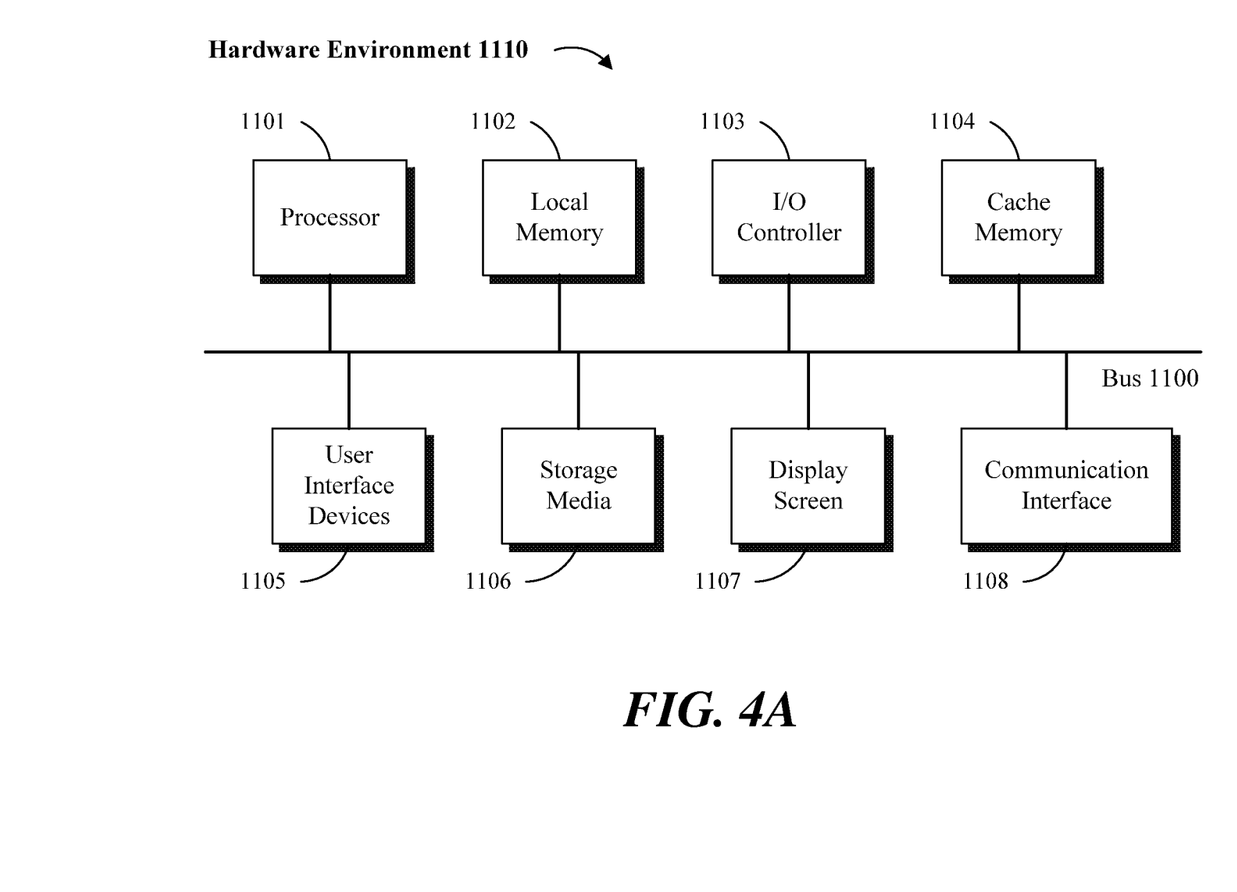
FIGS. 4A and 4B are block diagrams of hardware and software environments in which the disclosed systems and methods may operate, in accordance with one or more embodiments.
Figure 4B:
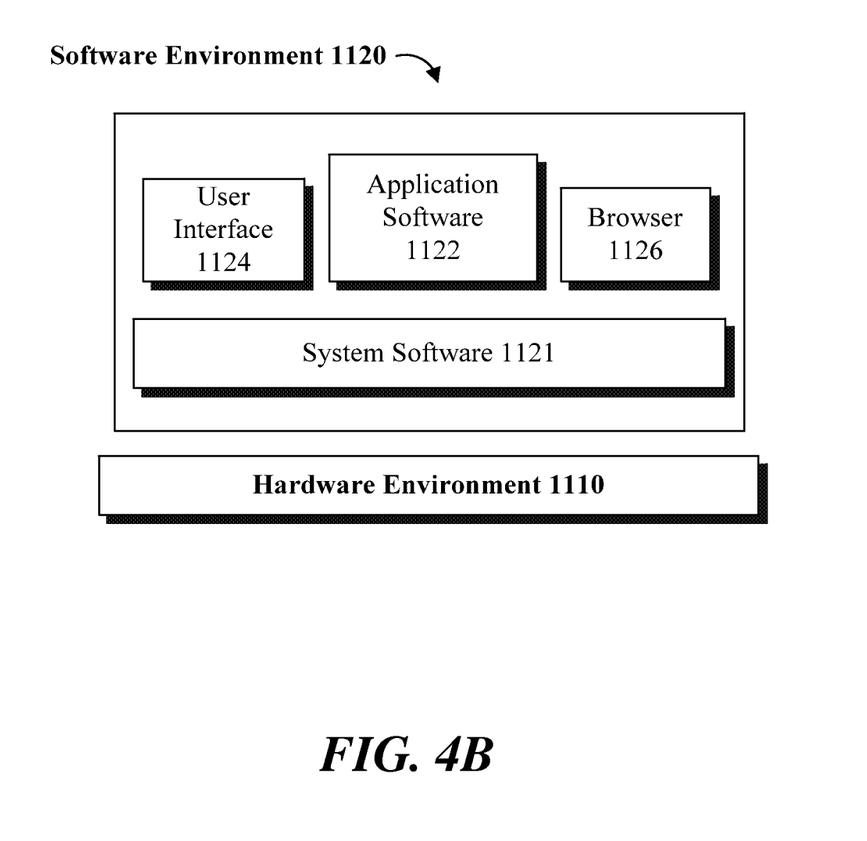

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A system for classifying documents, the system comprising:
    a processor; and
    a non-transitory computer readable storage medium having a computer readable program, the computer readable program executable by the processor to:
    before a new rule is added to a plurality of rules:
    applying the new rule to a plurality of previously classified documents;
    determining an application of the new rule results in misclassification of a given number of the plurality of previously classified documents;
    assigning to the new rule a damping factor based on the given number of misclassifications;
    adding the new rule to the plurality of rules with the assigned damping factor;
    classifying a document from among a plurality of documents in a first class, in response to applying statistical analysis to data associated with the document;
    classifying the document in a second class, in response to applying the new rule to the document according to the damping factor assigned to the new rule; and
    recalculating damping factors assigned to the plurality of rules, comprising:
        classifying the plurality of documents by applying the plurality of rules to the plurality of documents according to the damping factors assigned to the plurality of rules;
        inserting into a status matrix statuses of the classification of the plurality of documents;
        tallying the statuses in a column of the status matrix corresponding to a given rule; and
        recalculating the damping factor for the given rule based on the tallied statuses for the given rule,
    wherein each cell ($C_{ij}$) of the status matrix comprises a status of the classification of a given document (i) of the plurality of documents with respect to a given rule (j) of the plurality of rules,
    wherein the statuses comprise:
    X=the classification of the given document (i) improved by the given rule (j);
    Y=the classification of the given document (i) spoiled by given rule (j); and
    Z=the classification of the given document (i) unaffected by the given rule (j).

2. The system of claim 1, wherein the new rule is not added to the plurality of rules, in response to determining that the application of the new rule to the plurality of previously classified documents results in a degradation of an overall classification for the plurality of previously classified documents.

3. The system of claim 1, wherein the recalculated damping factor for the given rule (j)=(number of X's in column j of the status matrix)/(sum of the number of X's and Y's in column j).

4. A computer program product comprising a non-transitory computer readable storage medium having a computer readable program, wherein the computer readable program when executed on a computer causes the computer to:
    before a new rule is added to a plurality of rules:
    apply the proposed new to a plurality of previously classified documents;
    determine whether the application of the new rule results in misclassification of a given number of the plurality of previously classified documents;
    assign to the new rule a damping factor based on the given number of misclassifications;
    add the new rule to the plurality of rules with the assigned damping factor;
    classify a document from among a plurality of documents in a first class, in response to applying statistical analysis to data associated with the document;
    classify the document in a second class, in response to applying the new rule to the document according to the damping factor assigned to the new rule; and
    recalculate damping factors assigned to the plurality of rules, comprising:
        classify the plurality of documents by applying the plurality of rules to the plurality of documents according to the damping factors assigned to the plurality of rules;
        insert into a status matrix statuses of the classification of the plurality of documents;
        tally the statuses in a column of the status matrix corresponding to a given rule; and
        recalculate the damping factor for the given rule based on the tallied statuses for the given rule,
    wherein each cell ($C_{ij}$) of the status matrix comprises a status of the classification of a given document (i) of the plurality of documents with respect to a given rule (j) of the plurality of rules,
    wherein the statuses comprise:
    X=the classification of the given document (i) improved by the given rule (j);
    Y=the classification of the given document (i) spoiled by given rule (j); and
    Z=the classification of the given document (i) unaffected by the given rule (j).

5. The computer program product of claim 4, wherein the new rule is not added to the plurality of rules, in response to determining that the application of the new rule to the plurality of previously classified documents results in a degradation of an overall classification of the plurality of previously classified documents.

6. The computer program product of claim 4, wherein the recalculated damping factor for the given rule (j)=(number of X's in column j of the status matrix)/(sum of the number of X's and Y's in column j).

\* \* \* \* \*